(12) United States Patent
Sakurai et al.

(10) Patent No.: US 8,116,022 B2
(45) Date of Patent: Feb. 14, 2012

(54) MAGNETIC RECORDING APPARATUS, MAGNETIC RECORDING MEDIUM, AND METHOD OF TESTING MAGNETIC RECORDING APPARATUS

(75) Inventors: Masatoshi Sakurai, Tokyo (JP); Kazuto Kashiwagi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1 day.

(21) Appl. No.: 12/766,640

(22) Filed: Apr. 23, 2010

(65) Prior Publication Data

US 2010/0271726 A1    Oct. 28, 2010

(30) Foreign Application Priority Data

Apr. 24, 2009    (JP) ................................. 2009-106672

(51) Int. Cl.
*G11B 5/09*    (2006.01)
(52) U.S. Cl. ...................... 360/48; 360/135; 428/848.5
(58) Field of Classification Search .................. None
See application file for complete search history.

(56) References Cited

U.S. PATENT DOCUMENTS 7,265,930 B2 *    9/2007    Nakamura et al. .............. 360/75

FOREIGN PATENT DOCUMENTS

| JP | 62-275321 A | 11/1987 |
|----|-------------|---------|
| JP | 04-017117 A | 1/1992 |
| JP | 2005-038476 | 2/2005 |
| JP | 2005-038476 A | 2/2005 |
| JP | 2005-166115 A | 6/2005 |
| JP | 3987484 | 6/2005 |
| JP | 2006-048738 A | 2/2006 |
| JP | 2007-018651 A | 1/2007 |
| JP | 4099180 | 1/2007 |
| JP | 2007-193944 | 8/2007 |
| JP | 2007-193944 A | 8/2007 |

OTHER PUBLICATIONS

Information Sheet for IDS.
Notice of Reasons for Rejection mailed by Japan Patent Office on Jun. 29, 2010 in the corresponding Japanese patent application No. 2009-106672.

* cited by examiner

*Primary Examiner* — Jason Olson
(74) *Attorney, Agent, or Firm* — Knobbe, Martens, Olson & Bear, LLP

(57) ABSTRACT

According to one embodiment, a magnetic recording apparatus includes a magnetic recording medium including magnetically recordable recording tracks with a width L1, non-recording sections each provided between adjacent recording tracks, and a wide land track having a width L2 larger than the width L1 of the recording tracks, and a head slider including read and write heads.

6 Claims, 5 Drawing Sheets

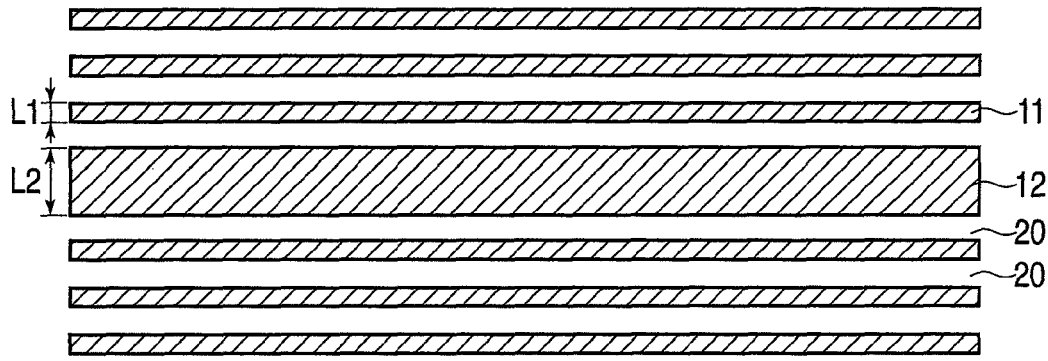
F I G. 6
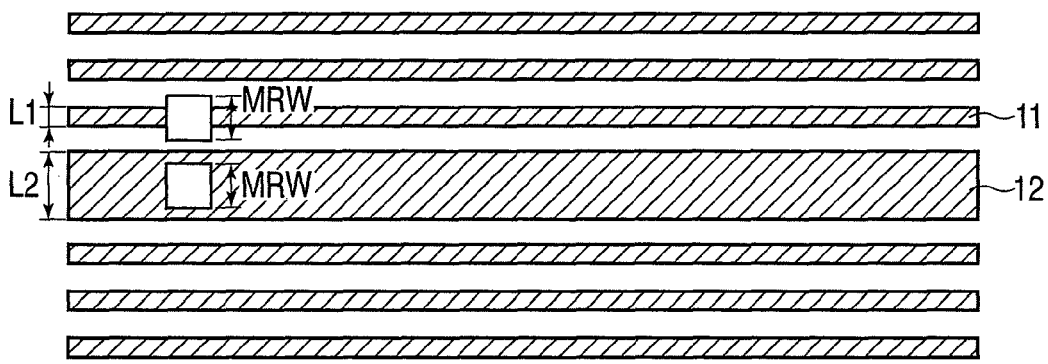
F I G. 7
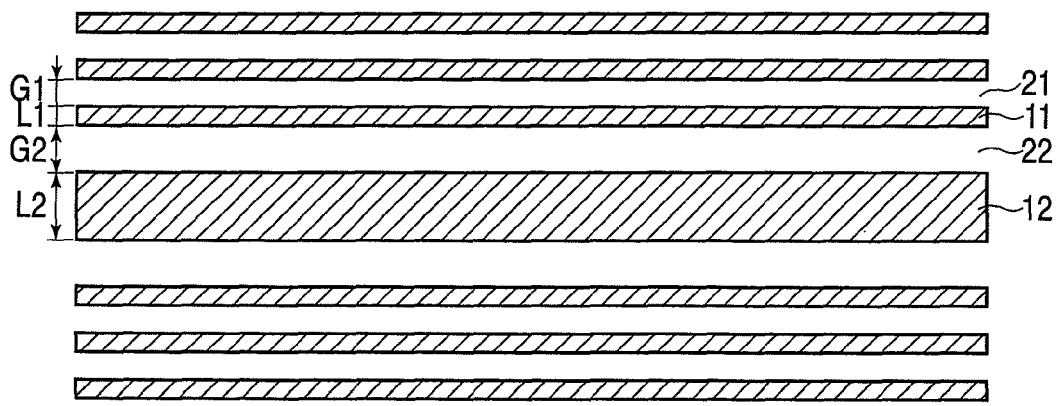
F I G. 8

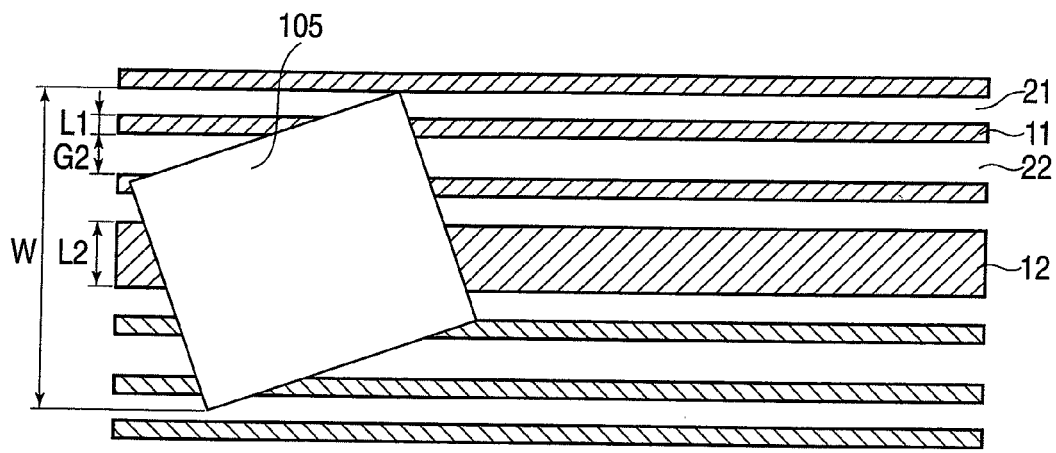
F I G. 9
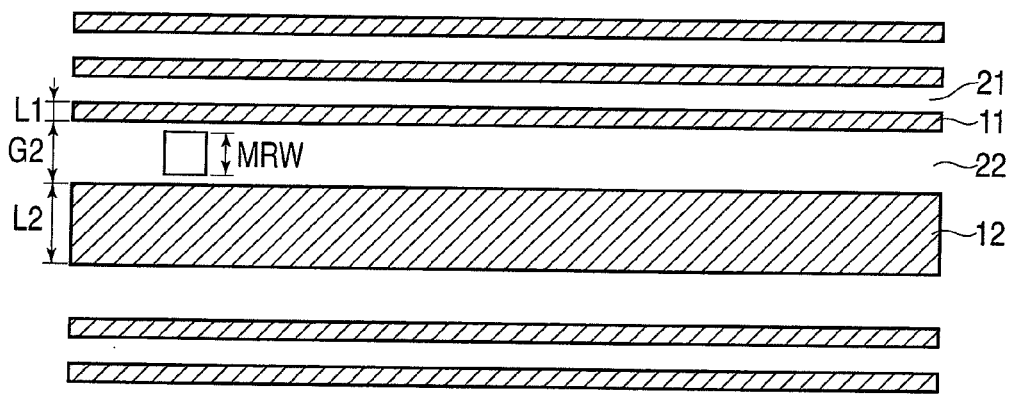
F I G. 10
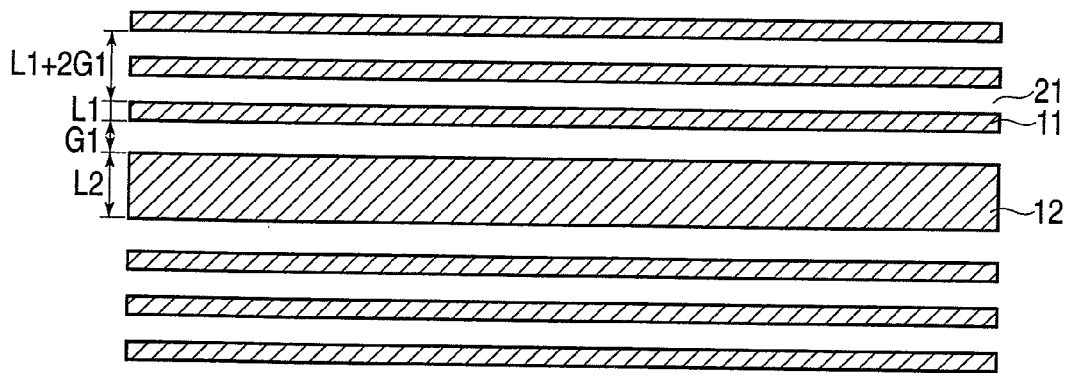
F I G. 11

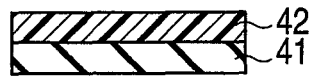
F I G. 12A
F I G. 12B
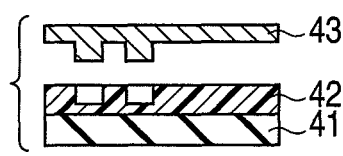
F I G. 12C
F I G. 12D
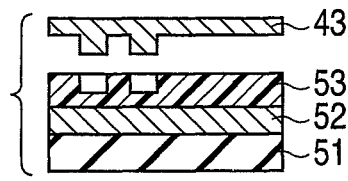
F I G. 12E
F I G. 12F
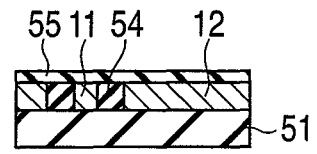
F I G. 12G
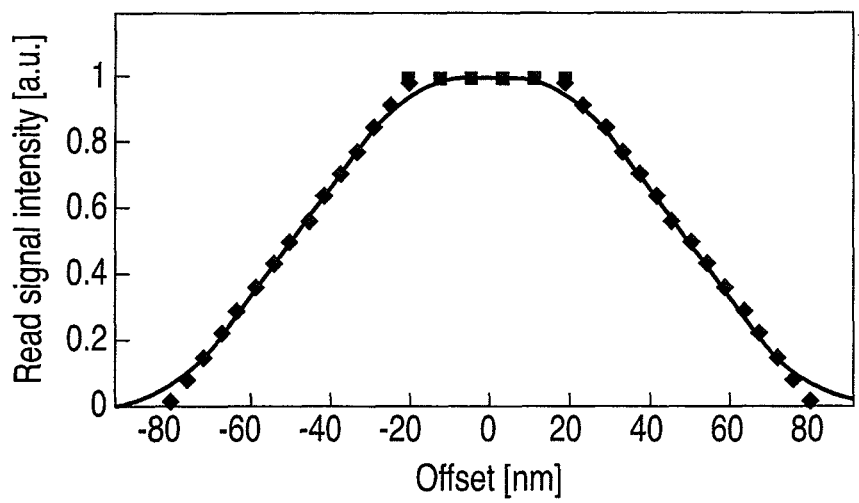
F I G. 13

MAGNETIC RECORDING APPARATUS, MAGNETIC RECORDING MEDIUM, AND METHOD OF TESTING MAGNETIC RECORDING APPARATUS

CROSS-REFERENCE TO RELATED APPLICATIONS

This application is based upon and claims the benefit of priority from Japanese Patent Application No. 2009-106672, filed Apr. 24, 2009, the entire contents of which are incorporated herein by reference.

BACKGROUND

1. Field

One embodiment of the present invention relates to a magnetic recording apparatus, a magnetic recording medium, and a method of testing a magnetic recording apparatus.

2. Description of the Related Art

To improve the recording density of a magnetic recording medium, a discrete track type magnetic recording apparatus is effective, which uses a discrete track recording medium in which non-recording sections are formed by removing or modifying those portions of a magnetic recording layer between recording tracks to suppress the interference related to read and write performed between adjacent recording tracks.

Meanwhile, in a magnetic recording apparatus, a test of the flying height of read/write heads, a test of the voltage and current of the read/write heads, and a signal degradation test are performed. Based on the results of these tests, the parameters of the magnetic recording apparatus are adjusted.

A magnetic recording medium mounted on a conventional magnetic recording apparatus includes a magnetic recording layer which is formed of a continuous film having no non-recording sections. Thus, the above-described tests and parameter adjustment based on the test results can be easily performed.

However, it is difficult to perform a test of the flying height of the read/write heads, a test of the voltage and current of the read/write heads, and a signal degradation test, using discrete tracks on a discrete track medium.

Jpn. Pat. Appln. KOKAI Publication No. 2005-38476 discloses a discrete track recording medium in which a groove for adjusting lift force which is applied to a magnetic head is provided in an outer region or an inner region of a data region where discrete tracks are formed.

However, in such a medium, it is difficult to adjust parameters other than the flying height of the read/write heads.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 6 is a plan view of a first magnetic recording medium according to the present invention;

FIG. 7 is a plan view of a second magnetic recording medium according to the present invention;

FIG. 8 is a plan view of a third magnetic recording medium according to the present invention;

FIG. 9 is a plan view of a fourth magnetic recording medium according to the present invention;

FIG. 10 is a plan view of a fifth magnetic recording medium according to the present invention;

FIG. 11 is a plan view of a sixth magnetic recording medium according to the present invention;

FIGS. 12A, 12B, 12C, 12D, 12E, 12F, and 12G are cross-sectional views showing a method of manufacturing a DTR medium according to the present invention; and FIG. 13 is a diagram describing a method of measuring a magnetic read width MRW.

DETAILED DESCRIPTION

Various embodiments according to the invention will be described hereinafter with reference to the accompanying drawings. In general, according to one embodiment of the invention, there is provided a magnetic recording apparatus comprising: a magnetic recording medium comprising magnetically recordable recording tracks with a width L1; non-recording sections each provided between adjacent recording tracks; and a wide land track having a width L2 larger than the width L1 of the recording tracks; and a head slider comprising read and write heads.

According to another embodiment of the invention, there is provided a magnetic recording medium comprising: magnetically recordable recording tracks with a width L1; non-recording sections each provided between adjacent recording tracks; and a wide land track having a width L2 larger than the width L1 of the recording tracks.

Figure 1:
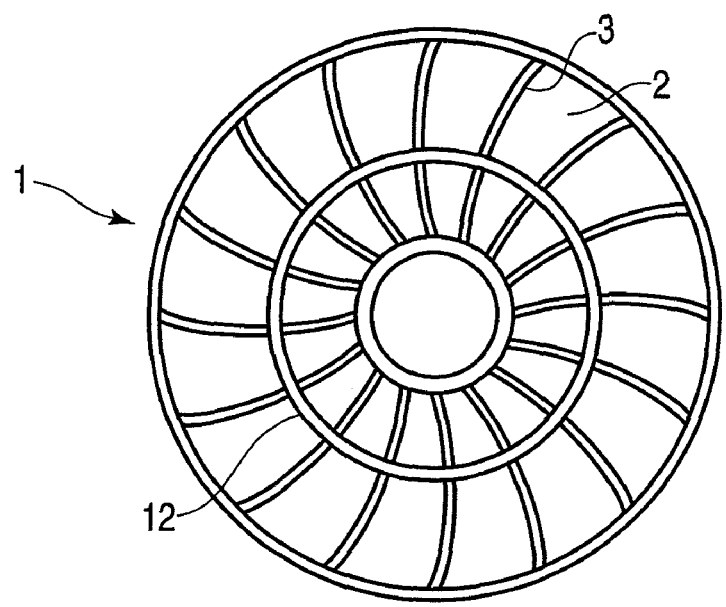
FIG. 1 is a plan view of a magnetic recording medium according to an embodiment of the present invention.

FIG. 1 is a schematic plan view of a magnetic recording medium (DTR medium) 1 according to an embodiment of the present invention. FIG. 1 shows data regions 2 and servo regions 3. The data regions 2 are regions where user data is recorded. As will be described in detail later, in the data regions 2, recording tracks (discrete tracks) of a patterned magnetic recording layer are formed and a wide land track 12 having a width L2 larger than a width L1 of the recording tracks is formed. In FIG. 1, the wide land track 12 is formed only in a middle portion of the medium but may be formed in a plurality of regions, e.g., three regions including an inner periphery, the middle portion, and an outer periphery. The shape of the servo regions 3 on the medium surface is a circular arc corresponding to a locus of a head slider during access. The servo regions 3 have a circumferential length which is larger as the radial position is closer to the outer peripheral side. Although FIG. 1 shows 16 servo regions 3, the actual medium has 100 or more servo regions 3 formed thereon.

Figure 2:
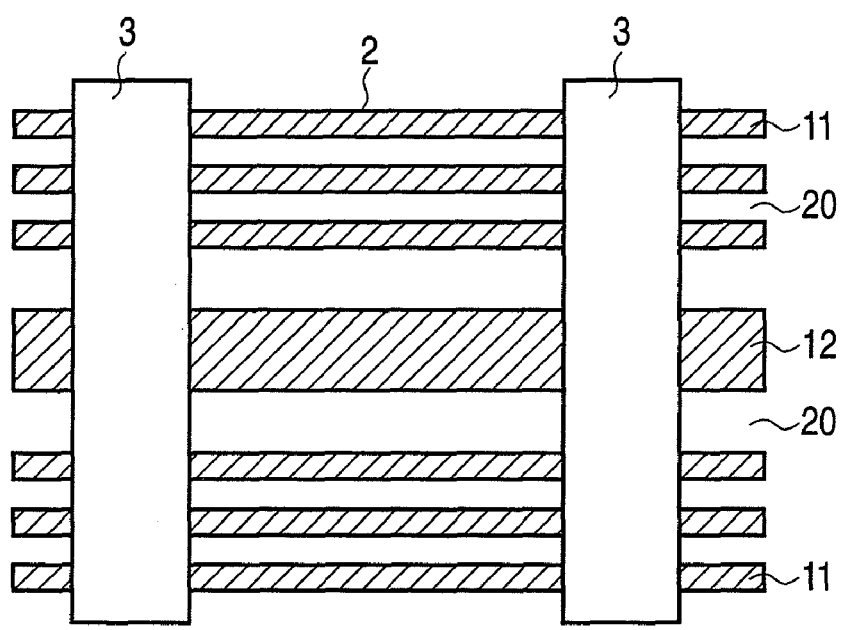
FIG. 2 is a plan view showing an example of arrangement of recording tracks and a wide land track.

FIG. 2 is a plan view showing an example of arrangement of the recording tracks and the wide land track. A data region 2 is divided into sectors by servo regions 3. In the data region 2, a number of recording tracks (discrete tracks) 11 with a width L1 and a wide land track 12 with a width L2 which extend in a circumferential direction are formed. The recording tracks 11 are used for magnetic recording of user data and the wide land track 12 is used to test the medium. A region between recording tracks 11 which are adjacent to each other along a radial direction and a region between a recording track 11 and the wide land track 12 are non-recording sections 20. The width L2 of the wide land track 12 is larger than the width L1 of the recording tracks 11.

Figure 3:
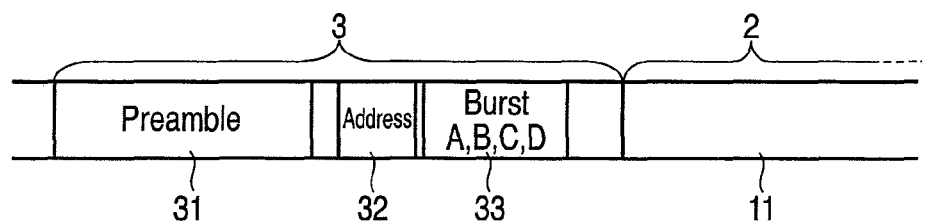
FIG. 3 is a schematic diagram of a servo region and a data region.
Figure 4:
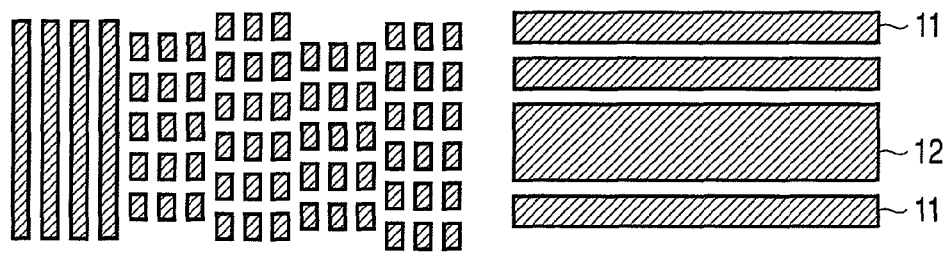
FIG. 4 is a plan view showing an example of magnetic patterns in a servo region and a data region.

FIG. 3 is a schematic diagram of a servo region and a data region. FIG. 4 is a plan view showing an example of magnetic patterns in the servo region and the data region.

A servo region 3 includes a preamble section 31, an address section 32, a burst section 33, etc. Magnetic patterns and non-recording sections which provide servo signals are formed in the preamble section 31, the address section 32, and the burst section 33 in the servo region 3. These sections have the following functions.

The preamble section 31 is provided to perform a PLL process for synchronizing a clock for reading a servo signal relative to a time lag which occurs due to the rotational eccentricity of the medium, etc., and an AGC process for maintaining appropriate signal read amplitude. In the preamble section 31, protruded recording sections which continuously and radially form substantially circular arcs without being separated in the radial direction are repeatedly formed in the circumferential direction.

In the address section 32, servo signal recognition codes called servo marks, sector information, cylinder information, etc., are formed at the same pitch as the circumferential pitch of the preamble section 31 by Manchester encoding. In particular, since the cylinder information has a pattern having information which varies from servo track to servo track, the cylinder information is recorded by Manchester encoding after being converted into Gray codes which provide minimum variation between adjacent tracks to reduce the influence of address reading errors during a seek operation.

The burst section 33 is an off-track detection region used to detect an off-track amount with respect to an on-track state for a cylinder address. In the burst section 33, four types of marks (called A, B, C, and D bursts) whose pattern phases are shifted from each other in the radial direction are formed. In each burst, a plurality of marks are arranged in the circumferential direction at the same pitch as that of the preamble section 31. The radial period of each burst is proportional to a period at which an address pattern changes, in other words, a servo track period. Each burst is formed in a length of about 10 periods in the circumferential direction and is formed repeatedly in the radial direction in a period twice as long as the servo track period.

The shape of the marks in the burst section 33 is designed to be a rectangle, or more precisely, a parallelogram which takes into account a skew angle during head access, but may be slightly rounded depending on precision in stamper processing or processing performance for transfer formation, etc. Note that the marks may be formed as non-recording sections or may be formed as recording sections. A detailed description of the principle of detection of a position based on the burst section 33 is omitted. An off-track amount is calculated by performing an arithmetic process on an average amplitude value of read signals from the A, B, C, and D bursts.

As shown in FIG. 4, in each of the recording tracks 11 and the wide land track 12, positioning of the read/write heads is performed using servo patterns.

In the present invention, magnetic patterns, which form recording tracks, a wide land track, and servo patterns, and non-recording sections may be distinguished by the difference in the thickness of the magnetic recording layer or may be distinguished by the variation in the characteristics of the magnetic recording layer, e.g., the difference in crystal state. When the magnetic patterns and the non-recording sections are distinguished by the difference in the thickness of the magnetic recording layer, all of recessed portions of the magnetic recording layer may be removed or some of the recessed portions of the magnetic recording layer may be left. Alternatively, after a nonmagnetic material is filled into the recessed portions between magnetic patterns, the surface may be flattened.

Figure 5:
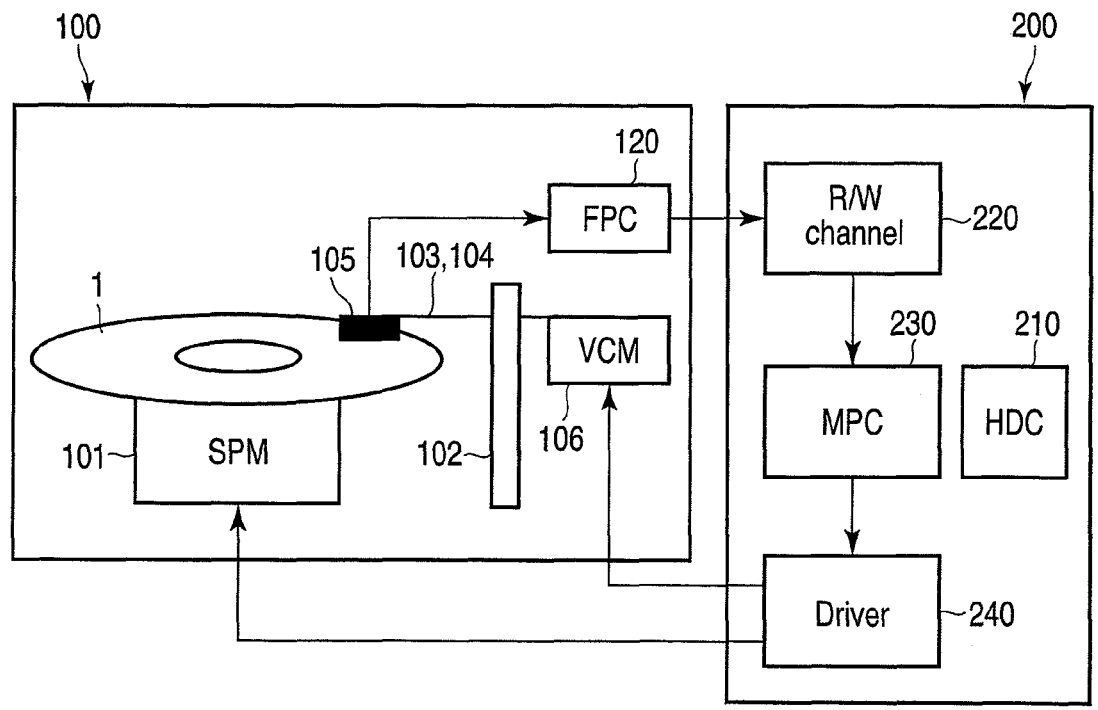
FIG. 5 is a block diagram of a magnetic recording apparatus according to an embodiment of the present invention.

Next, a magnetic recording apparatus according to an embodiment of the present invention will be described. FIG. 5 is a block diagram of a magnetic recording apparatus according to an embodiment of the present invention. Although the drawing shows a head slider only above a top surface of a magnetic recording medium, a perpendicular magnetic recording layer having discrete tracks is formed on each surface of the magnetic recording medium and a down head and an up head are respectively provided above the bottom and top surfaces of the magnetic recording medium.

A disk drive includes a main body unit called a head disk assembly (HDA) 100 and a printed circuit board (PCB) 200.

The head disk assembly (HDA) 100 has a magnetic recording medium (DTR medium) 1; a spindle motor 101 which rotates the magnetic recording medium 1; an actuator arm 103 which pivots about a pivot 102; a suspension 104 attached to an end of the actuator arm 103; a head slider 105 supported by the suspension 104 and including a read head and a write head; a voice coil motor (VCM) 106 which drives the actuator arm 103; a head amplifier (HIC) (not shown) which amplifies input signals to and output signals from the heads; and the like. The head amplifier (HIC) is provided on the actuator arm 103 and is connected to the printed circuit board (PCB) 200 via a flexible cable (FPC) 120. Note that providing the head amplifier (HIC) on the actuator arm 103 in the above-described manner can effectively reduce noise in head signals but the head amplifier (HIC) may be fixed to the HDA main body.

As described above, the perpendicular magnetic recording layer is formed on each surface of the magnetic recording medium 1, and servo regions which form circular arcs are formed on each surface of the magnetic recording medium 1 so as to correspond to a locus along which the heads move. The specifications of the magnetic recording medium meet outer and inner diameters, read and write characteristics, etc., which are adapted to the drive. The radius of a circular arc formed by each servo region is given as a distance from the pivot to the magnet head element.

The printed circuit board (PCB) 200 has four major system LSIs mounted thereon. The system LSIs are a disk controller (HDC) 210, a read/write channel IC 220, an MPU 230, and a motor driver IC 240.

The MPU 230 is a control unit of a drive driving system and includes a ROM, a RAM, a CPU, and a logic processing unit which implement a head positioning control system according to the present embodiment. The logic processing unit is an arithmetic processing unit configured by a hardware circuit and performs a high-speed arithmetic process. Firmware (FW) for the logic processing unit is saved in the ROM. The MPU 230 controls the drive in accordance with the FW.

The disk controller (HDC) 210 is an interface unit in the hard disk. The disk controller (HDC) 210 manages the whole drive by exchanging information with interfaces between the disk drive and a host system (e.g., a personal computer) and with the MPU 230, the read/write channel IC 220, and the motor driver IC 240.

The read/write channel IC 220 is a head signal processing unit which relates to reads/writes. The read/write channel IC 220 is configured by a circuit which processes channel switching of the head amplifier (HIC) and read and write signals for reads/writes, etc.

The motor driver IC 240 is a drive driver unit of the voice coil motor (VCM) 106 and the spindle motor 101. The motor driver IC 240 performs control to drive the spindle motor 101 at a constant rotation rate and drives a head moving mechanism by providing, as a current value, the amount of VCM operation from the MPU 230, to the VCM 106.

Next, the patterns of recording tracks, a wide land track, and non-recording sections on a magnetic recording medium according to the present invention will be described in detail.

FIG. 6 is a plan view of a first magnetic recording medium according to the present invention. In FIG. 6, in a data region, a number of recording tracks 11 with a width L1 and a wide land track 12 with a width L2 which extend in the circumferential direction are formed. The width L2 of the wide land track 12 is larger than the width L1 of the recording tracks 11. Recording tracks 11 which are adjacent to each other along the radial direction and a recording track 11 and the wide land track 12 are separated by non-recording sections 20 having the same width. As described above, the recording tracks 11 are used for magnetic recording of user data and the wide land track 12 is used to test the medium.

FIG. 7 is a plan view of a second magnetic recording medium according to the present invention. FIG. 7 shows a magnetic read width MRW of a read element which is loaded on a medium having the same recording tracks 11 and wide land track 12 as those in FIG. 6. The magnetic read width MRW is a value indicating at what width the magnetic recording on the medium is read by the read element in a cross-track direction. The width L1 of the recording tracks 11 is smaller than the magnetic read width MRW and the width L2 of the wide land track 12 is larger than the magnetic read width MRW.

A method of measuring the magnetic read width MRW will be described with reference to FIG. 13.

(1) Signals with a constant frequency are recorded on the medium by the read/write heads.

(2) The read/write heads are offset in the cross-track direction to read the signals recorded in (1). A solid line in FIG. 13 indicates the relationship between the position of the read element (offset amount) and the read signal intensity.

(3) A trapezoidal approximation is performed on a profile obtained in (2). A broken line in FIG. 13 indicates the trapezoidal approximated profile. The offset amount of the read element corresponding to the width of one oblique side of the obtained trapezoid is MRW. In FIG. 13, the MRW is 60 [nm].

In the magnetic recording apparatus according to the present invention, the characteristics of read signals tested on the wide land track 12 need to be equivalent to the characteristics of read signals tested on a medium having a magnetic recording layer formed of a continuous film. Therefore, the width L2 of the wide land track 12 is made larger than the magnetic read width MRW of the read element. In addition, based on the characteristics of the read signals tested on the wide land track 12, an adjustment to the parameters of the magnetic recording apparatus according to the present invention is made. On the other hand, since read signals are not tested on the recording tracks 11, the width L1 of the recording tracks 11 does not need to be made larger than the magnetic read width MRW. It is rather desirable to make the magnetic read width MRW of the read element larger than the width L1 of the recording tracks 11 so as to read signals recorded on the recording tracks 11 at a high intensity.

FIG. 8 is a plan view of a third magnetic recording medium according to the present invention. The magnetic recording medium in FIG. 8 differs from the magnetic recording medium in FIG. 6 in that, when the width of a first non-recording section 21 between two adjacent recording tracks 11 (more precisely, a narrower one of non-recording sections on both sides of a recording track 11 is defined as the first non-recording section 21) is G1, a second non-recording section 22 having a width G2 larger than the width G1 of the first non-recording section 21 is provided on each side of a wide land track 12.

A method of manufacturing a magnetic recording medium according to the present invention includes, as will be described later, an imprinting process for transferring patterns of protrusions and recesses to a resist which is applied onto a magnetic recording layer, by pressing a stamper against the resist. In the imprinting process, those portions of the resist corresponding to non-recording sections are pressed down by protrusions of the stamper and pressed-out portions of the resist move to recesses of the stamper corresponding to recording sections which are adjacent to the non-recording sections; as a result, patterns of protrusions and recesses are transferred to the resist. The resist patterns thus formed function as masks upon processing the magnetic recording layer. Hence, when the protrusions of the resist do not have a sufficient thickness, the magnetic recording layer cannot be processed.

The width of a recess of the stamper corresponding to the wide land track is larger than the width of recesses of the stamper corresponding to the recording tracks. Thus, to secure the thickness of the protrusion of the resist on the wide land track, a larger amount of resist is required than that for the recording tracks. Namely, more resist needs to be supplied to the recess of the stamper corresponding to the wide land track from protrusions of the stamper near the recess. For this purpose, it is preferred that the second non-recording section 22 having the width G2 larger than the width G1 of the first non-recording section 21 which is provided between two adjacent recording tracks 11 be provided on each side of the wide land track 12.

FIG. 9 is a plan view of a fourth magnetic recording medium according to the present invention. As shown in FIG. 9, a second non-recording section 22 having a width G2 does not necessarily need to be provided on each side of a wide land track 12 and second non-recording sections 22 having the width G2 may be provided near the wide land track 12 within the width W of the head slider 105.

Here, the flying height of the head slider is influenced by protrusions and recesses on the surface of the medium under the head slider. Specifically, the larger the recesses over the protrusions the lower the flying height of the head slider, and the larger the protrusions over the recesses the higher the flying height of the head slider. In the magnetic recording medium according to the present invention, since the width L2 of the wide land track 12 is larger than the width L1 of the recording tracks 11, when the wide land track 12 is located under the head slider 105, the flying height of the head slider 105 may increase. To avoid such a variation in the flying height of the head slider 105, it is preferred that second non-recording sections 22 having the width G2 be provided near the wide land track 12 within the width W of the head slider 105. The width W of the head slider 105 indicates the radial length of the head slider 105 projected onto the medium when, as shown in FIG. 9, the head slider 105 has a skew angle. Therefore, the width W of the head slider 105 is minimum at a position where the skew angle is zero. In the present invention, second non-recording sections 22 having the width G2 should be included near the wide land track 12 within the width W of the head slider 105 at the position where the skew angle is zero.

Since the size of a normal head slider facing the medium is generally a rectangle of 1 mm×1 mm or less, it is preferred that second non-recording sections 22 with the width G2 be provided in a range within 1 mm in the radial direction of the medium from the wide land track 12.

Note that since the wide land track 12 and the second non-recording section 22 have different radial positions, when the two are too far away from each other, it is likely that only one of the two comes within the width W of the head slider 105. Hence, it is preferred that the radial distance between the wide land track 12 and the second non-recording section 22 be small. Accordingly, it is preferred that, as shown in FIG. 8, the wide land track 12 and the second non-recording section 22 be adjacent to each other.

FIG. 10 is a plan view of a fifth magnetic recording medium according to the present invention. In the magnetic recording medium in FIG. 10, the width G2 of second non-recording sections 22 provided near a wide land track 12 is larger than the magnetic read width MRW of the read/write heads.

A DTR medium requires characteristics that magnetic recording is not performed on non-recording sections. However, the non-recording sections may be in a magnetically recordable state, depending on processing variations occurring during the fabrication of the medium. By performing a signal test on the non-recording section upon shipment of an apparatus, defective media can be sorted out.

When, as shown in FIG. 10, the width G2 of the second non-recording section 22 is larger than the magnetic read width MRW of the read/write heads, a signal can be read only from the second non-recording section 22 by causing the magnetic write head to access the second non-recording section 22, without being influenced by an adjacent magnetic pattern. Thus, the characteristics of the non-recording section can be evaluated.

FIG. 11 is a plan view of a sixth magnetic recording medium according to the present invention. In the magnetic recording medium in FIG. 11, the width L2 of a wide land track 12, the width L1 of recording tracks 11, and the width G1 of first non-recording sections 21 satisfy the following relationship:

$$L2 \geq L1 + 2G1.$$

Considering performing a read operation on a target recording track 11 by the read element, in order to suppress the interference of read signals from adjacent recording tracks 11, the magnetic read width MRW of the read element needs to be smaller than the sum of the width L1 of the recording track 11 and the widths G1 of two non-recording sections 21 on both sides of the recording track 11 and thus MRW<L1+2G1. On the other hand, as described above, the magnetic read width MRW of the read element needs to be smaller than the width L2 of the wide land track 22 and thus MRW<L2.

In the magnetic recording apparatus of the present invention, the flying height of the read/write heads and the current and the voltage of the read/write elements are adjusted based on the results of tests on the wide land track 12. The magnetic write width MWW of the write element before adjustment changes depending on the flying height of the read/write heads, the current and the voltage of the read/write elements, etc. To properly obtain measurement values upon adjustment in the tests, the width L2 of the wide land track 12 needs to be widened to some extent. In the recording tracks 11, on the other hand, read and write are performed using optimum values which are obtained after tests on the wide land track 12 and adjustment. Thus, allowance does not need to be made for the widths of the recording tracks 11 and the non-recording sections 21 on both sides of each recording track 11. In addition, to increase the recording density, it is desirable that the recording tracks 11 occupying the majority of the area of the medium be formed at a narrow track pitch. For these reasons, it is preferred that the width L2 of the wide land track 12 be the same as or larger than (L1+2G1) which is the sum of the width L1 of the recording track 11 and the widths G1 of two non-recording sections 21 on both sides of the recording track 11.

In the magnetic recording medium of the present invention, it is preferred that the number of wide land tracks be smaller than the number of recording tracks. The wide land track is used in a test process but is not used for magnetic recording of user data. Thus, the larger the area occupied by the wide land track, the smaller the recording capacity. In addition, a test process using the wide land track does not need to be performed on the entire surface of the medium but is performed on a part of the medium, such as the middle portion or the inner periphery of the medium or the middle portion and the outer periphery of the medium. Accordingly, to secure recording capacity, it is preferred that the number of wide land tracks be smaller than the number of recording tracks.

It is preferred that the magnetic recording medium of the present invention have one or more recording tracks on the inner peripheral side and the outer peripheral side of the wide land track. The magnetic recording apparatus of the present invention has a head slider which flies over the rotating magnetic recording medium. The flying height of the head slider is influenced by the shapes of protrusions and recesses on the surface of the medium. In particular, near the wide land track, the width of a magnetic pattern (protrusion) and the width of a second non-recording section (recess) suddenly change as compared with a recording track (protrusion) and a first non-recording section (recess), and thus, the flying height of the head slider is likely to be influenced. To minimize the influence, it is desirable that the shape of a portion of the medium near the wide land track be close to the recording tracks. Specifically, it is preferred that a recording track be formed on each side of the wide land track. Therefore, as shown in FIG. 6, it is preferred that one or more recording tracks 11 be provided on the inner peripheral side and the outer peripheral side of the wide land track 12.

In the magnetic recording apparatus of the present invention, since the read head and the write head are arranged side by side on the head slider with a distance provided therebetween in the track direction, a head position adjustment is required during read and write operations, for the amount of angle of the slider tilting in the track direction according to the skew angle. It is preferred that an evaluation be made at a position where the offset amount is reduced by providing the wide land track at a position where the skew angle of the read/write heads is zero.

In the magnetic recording apparatus of the present invention, as shown in FIG. 5, the head slider 105 including the read/write heads is attached to an end of the suspension 104 via the actuator arm 103, and the locus of the heads is a circular arc along the rotation of the actuator arm 103 which is actuated by the voice coil motor (VCM) 106. Thus, the angle of the read/write elements relative to the recording track, i.e., skew angle, changes depending on the position of the actuator arm 103.

Tests on the magnetic recoding apparatus of the present invention are preferably performed at a position where the skew angle of the read/write elements is zero. Therefore, in the magnetic recording medium of the present invention, it is preferred that the wide land track on which tests are performed be provided at the position where the skew angle is zero. Note, however, that the wide land track of the magnetic recording medium of the present invention does not necessarily need to be provided only at the position where the skew angle is zero and may be provided in a plurality of regions so that tests can be performed in various regions from the inner periphery to the outer periphery.

In the magnetic recording apparatus of the present invention, any of a test of the flying height of the read/write heads, a test of the voltage and the current of the read/write heads, and a signal degradation test is performed by performing a read and a write with the read/write heads being caused to fly over the wide land track, and various parameters of the magnetic recording apparatus are adjusted based on the test results.

A method of manufacturing a DTR medium according to the present invention will be described with reference to FIGS. 12A to 12G.

First, an imprint stamper is manufactured in the manner shown in FIGS. 12A to 12C. As shown in FIG. 12A, an electron beam resist 42 is applied onto a stamper substrate 41. As the substrate, a Si substrate or a glass substrate is preferably used. As shown in FIG. 12B, patterns corresponding to non-recording sections between recording tracks and between a recording track and a wide land track are written with an electron beam and is subjected to a development process, whereby patterns of protrusions and recesses are formed on a surface of the resist 42. As shown in FIG. 12C, a Ni electroforming layer is formed on the electron beam resist 42 on the substrate 41 and is then removed, whereby a stamper 43 having patterns of protrusions and recesses is obtained. The patterns of protrusions and recesses transferred to a surface of the stamper 43 are reversed patterns of protrusions and recesses on the resist 42. Note that Ni is preferably used as the material of the stamper but the material is not limited thereto.

Then, as shown in FIGS. 12D to 12G, a DTR medium is manufactured using an imprinting method. Recesses on the surface of the stamper 43 correspond to magnetic patterns (recording tracks or a wide land track) and protrusions correspond to non-recording sections. A portion on the stamper corresponding to the wide land track is a recess with a larger width than the recording tracks and a portion on the stamper corresponding to a second non-recording section provided near the wide land track is a protrusion with a larger width than a first non-recording section between recording tracks.

As shown in FIG. 12D, a magnetic recording layer 52 is deposited on a medium substrate 51. An imprint resist 53 is applied onto the magnetic recording layer 52. As shown in FIG. 12E, the stamper 43 is allowed to face the resist 53 on a surface of the medium substrate 51 and the stamper 43 is pressed against the resist 53 by applying a pressure between the stamper 43 and the medium substrate 51, whereby the patterns of protrusions and recesses on the surface of the stamper 43 are transferred to the resist 53. Thereafter, the stamper 43 is removed.

Upon imprinting, when the distance between the wide land track and the second non-recording section with a large width is 1 mm or more, a portion of the resist that is pushed aside by a protrusion with a large width on the stamper corresponding to the second non-recording section does not reach a recess with a large width on the stamper corresponding to the wide land track. As a result, a protrusion of the resist corresponding to the wide land track may not obtain a sufficient height. In this case, when those portions of the magnetic recording layer corresponding to the recesses of the resist are etched in a subsequent process, a portion of the magnetic recording layer corresponding to the surface of the wide land track may also be etched.

On the other hand, when the distance between the wide land track and the second non-recording section with a large width is within 1 mm, the protrusion of the resist corresponding to the wide land track obtains a sufficient height. In this case, when those portions of the magnetic recording layer corresponding to the recesses of the resist are etched in a subsequent process, a portion of the magnetic recording layer corresponding to the surface of the wide land track is not etched.

As shown in FIG. 12F, using the resist 53 having patterns of protrusions and recesses transferred thereto as a mask, the magnetic recording layer 52 is etched, whereby recesses corresponding to non-recording sections are formed. As shown in FIG. 12G, the recesses are filled with a nonmagnetic material and the surface is flattened, whereby non-recording sections 54 are formed. Note that the surface of the medium does not need to be completely flattened and protrusions and recesses may remain on the surface of the medium. Thereafter, a carbon protective film 55 is deposited on the entire surface. Furthermore, a lubricant is applied onto the carbon protective film 55, whereby a DTR medium is manufactured.

EXAMPLES

Methods of testing and adjusting a magnetic recording apparatus according to the present invention will be described below.

[Adjustment to the Flying Height of the Head]

The read/write heads were positioned over the wide land track and non-modulated continuous rectangular waves were recorded at a recording wavelength $\lambda_1$ [nm]. A flying height adjustment amount was set to $D_0$ such that the maximum flying height of the heads was $H_0$ [nm], and a positioning error amount $PE_0$ was obtained. With the flying height adjustment amount of head being sequentially set such that the flying height of the head was smaller than the maximum flying height $H_0$ little by little, positioning error amounts PE were obtained. A flying height adjustment amount that is the first one to obtain $PE>PE_0$ was determined to be a flying height adjustment amount $D_1$ corresponding to the flying height $H_1=0$ [nm]. The previously recorded non-modulated continuous rectangular waves were read and read signals were sequentially A/D converted. Then, by fast Fourier transform, an amplitude $V_1$ of a signal component (fundamental wave component) of the recording wavelength $\lambda_1$ [nm] in each read signal and an amplitude $V_3$ of a signal component (third harmonic component) of $\lambda_3=\lambda_1/3$ [nm] in the read signal were calculated and an amplitude ratio $R_0=V_1/V_3$ was obtained. With the flying height adjustment amount D being sequentially set such that the flying height of the head was higher than a minimum flying height $H_1$ little by little, amplitude ratios R were similarly obtained. In addition, a flying height H [nm] for when the amplitude ratio is R was sequentially estimated by the following equation:

$$H=K(3\cdot\lambda_3)\log(R/R_0)/4\pi \quad (1)$$

where R is the obtained amplitude ratio, $R_0$ is the amplitude ratio at the minimum flying height $H_1$, and log is the natural logarithm. K represents the measurement correction coefficient and is dependent on the design of patterns of protrusions and recesses on individual media.

Here, in a magnetic recording apparatus incorporating a conventional DTR medium, the correction coefficient K varies according to the design of patterns of protrusions and recesses of recording tracks and thus the correction coefficient K needs to be calculated each time the design of patterns of protrusions and recesses is changed. Hence, an adjustment to the flying height of the head takes a long time.

On the other hand, in the magnetic recording apparatus incorporating a DTR medium having a wide land track according to the present invention, the correction coefficient K for the wide land track can be uniquely determined independent of the design of patterns of protrusions and recesses. Hence, the correction coefficient K does not need to be derived while the flying height of the head is adjusted, enabling to reduce the time required to adjust the flying height of the head.

By comparing the sequentially estimated flying heights H [nm] with a target flying height $H_1$ [nm], a flying height adjustment amount $D_1$ obtained when $H \geq H_1$ [nm] was obtained. Then, based on the flying height adjustment amount $D_1$, the flying height of the head was able to be adjusted.

[Adjustment to the Bias Voltage of the Read Element]

The read/write heads were positioned over the wide land track and modulated signals were recorded at a track recording density LD [Mbit/mm$^2$]. With the bias voltage of the read element being changed from $VB_0$ [mV] to $VB_2$ [mV] ($VB_0 < VB_2$), the previously recorded signals were read and demodulated and error rates ER were calculated. $VB_1$ corresponding to a minimum value $ER_1$ among the obtained error rates was determined to be the bias voltage of the read element. In this manner, an optimum bias voltage of the read element at which the error rate is lowest was able to be determined.

[Adjustment to the Current of the Write Element]

The read/write heads were positioned over a recording track which was not the wide land track, and modulated signals were recorded at a track recording density LD [Mbit/mm$^2$], with the recording current being changed from $Iw_0$ [mA] to $Iw_2$ [mA] ($Iw_0 < Iw_2$). The signals recorded at the respective recording currents were read and demodulated and error rates ER were calculated. A minimum value $ER_1$ among the obtained error rates was determined. As a result, comparing with an error rate $ER_t$ which is allowable as the read and write performance of the magnetic recording apparatus, the condition of $ER_1 > ER_t$ was exhibited, which revealed that the read and write performance was insufficient with a combination of the heads and the medium.

Here, in a magnetic recording apparatus incorporating a conventional DTR medium, it is impossible to identify whether the cause for insufficient read and write performance is dependent on the design or quality of the read/write heads or results from the design or quality of the medium.

In the magnetic recording apparatus incorporating a DTR medium having a wide land track according to the present invention, the read/write heads were positioned over the wide land track and the same test as that described above was performed. As a result, the condition of $ER_1 < ER_t$ was exhibited and thus the desired read and write performance of the magnetic recording apparatus was satisfied. From the result of the test, it became clear that there was a problem in the design or quality of the medium and thus it was determined that to satisfy the read and write performance the design or quality of the medium needed to be improved.

[Signal Degradation Test]

The read/write heads were positioned over a recording track which was not the wide land track and modulated signals were recorded at a track recording density LD [Mbit/mm$^2$]. At elapsed time $t_0$ soon after the recording, the previously recorded signals were read and demodulated and an error rate $ER_0$ was calculated. During a period from elapsed times $t_0$ to $t_1$ ($t_0 < t_1$), the previously recorded signals were read and demodulated at constant time intervals and error rates ER were sequentially calculated. To estimate the speed at which the recording quality degrades, an increase rate $\Delta ER/t$ of the error rate per unit time during the period from $t_0$ to $t_1$ was derived by approximation from the results of the sequentially calculated error rates ER. The derived increase rate of the error rate was extrapolated to a desired product life $t_2$ and the error rate $ER_0 + (\Delta ER/t \times t_2)$ was calculated. When this error rate was compared with an error rate ERT which is allowable to guarantee the record retention performance of the magnetic recording apparatus, $ER_0 + (\Delta ER/t \times t_2) > ERT$, which revealed that the record retention performance of the magnetic recording apparatus was insufficient with a combination of the heads and the medium.

Here, in a magnetic recording apparatus incorporating a conventional DTR medium, it is impossible to identify whether the cause for insufficient record retention performance is dependent on the design or quality of the read/write heads or results from the design or quality of the medium.

In the magnetic recording apparatus incorporating a DTR medium having a wide land track according to the present invention, the read/write heads were positioned over the wide land track and the same test as that described above was performed. As a result, $ER_1 < ERT$ and thus the desired record retention performance of the magnetic recording apparatus was satisfied. From the result of the test, it became clear that there was a problem in the design or quality of the medium and thus it was determined that to satisfy the record retention performance the design or quality of the medium needed to be improved.

[Test on the Non-Recording Section]

In a magnetic recording apparatus A or B incorporating a recording medium A or B, the read/write heads were positioned over the wide land track and over the second non-recording section having the width G2 larger than MRW which was provided on each side of the wide land track, and signals of a constant frequency were recorded on each of the media and then the signals were read and signal intensities were measured. The ratio of the signal intensity in the non-recording section to the signal intensity in the wide land track was 0.0% for the apparatus A and 30% for the apparatus B.

Then, an adjacent recording test was performed on the recording track a plurality of times. As a result, the apparatus A passed and the apparatus B failed. The structures of the recording media A and B were analyzed. As a result, it was confirmed that, while in the recording medium A those portions of the magnetic recording layer in the recesses were completely removed, in the recording medium B portions of the magnetic recording layer remained in the recesses.

The above-described plural adjacent recording tests take about one hour. On the other hand, a test on the non-recording section is completed in about one minute, which is performed by positioning the read/write heads over the second non-recording section having the width G2 larger than MRW which is provided on each side of the wide land track. Accordingly, by making evaluations beforehand based on the tests on the non-recording section to eliminate defective pieces, the pass rate for plural adjacent recording tests can be increased, enabling to reduce the time required for the tests.

[Examples of Manufacturing of DTR Media]

Manufactured DTR media were 1.8 inches in diameter. The protrusions and recesses on the surface where magnetic patterns and non-recording sections were formed were 10 nm. The track pitch of recording tracks was 325 kTPI (78 nm), the width L1 of the recoding tracks was 52 nm, and the width G1 of first non-recording sections each between recording tracks was 26 nm. The width of a wide land track was 50 μm. The following three types of DTR media were manufactured by changing the design of second non-recording sections.

(1) A DTR medium having no second non-recording sections with a width G2.

(2) A DTR medium having a second non-recording section with a width G2 of 25 μm provided at a position 1 mm away from the wide land track.

(3) A DTR medium having a second non-recording section with a width G2 of 25 μm provided on each side of the wide land track with a width of 50 μm.

Using a head slider of 1 mm×1 mm, read and write operations were performed at a flying height of 10 nm from the surface of the medium. The magnetic read width MRW of the read element was 80 nm.

In the DTR medium of (1), when the head slider accessed a region including the wide land track, the flying height was increased by 0.05 nm and the signal intensity decreased.

In the DTR medium of (2), when the head slider accessed a region including the wide land track and the second non-recording sections 1 mm away from the wide land track, the flying height did not change.

In the DTR medium of (3), when the head slider accessed a region including the wide land track and the second non-recording section on each side of the wide land track, there was no change in flying height in almost all regions.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording apparatus comprising:
a head slider comprising read and write heads; and
a magnetic recording medium, comprising:
    magnetically recordable recording tracks with a width $L1$;
    non-recording-areas between adjacent recording-tracks; and
    a wide land track comprising a width $L2$ larger than $L1$,
wherein $L1$ is smaller than a magnetic read width MRW of the read and write heads, and $L2$ is larger than MRW, and
wherein non-recording areas adjacent to sides of a recording track comprise a first non-recording area with a width $G1$ and a second non-recording area with a width $G2$ larger than $G1$, and wherein the second non-recording area is adjacent to the wide land track.

2. A magnetic recording apparatus comprising:
a head slider comprising read and write heads; and
a magnetic recording medium, comprising:
    magnetically recordable recording-tracks with a width $L1$;
    non-recording areas between adjacent recording-tracks; and
    a wide land track comprising a width $L2$ larger than $L1$,
wherein $L1$ is smaller than a magnetic read width MRW of the read and write heads, and $L2$ is larger than MRW, and
wherein non-recording areas adjacent to sides of a recording track comprise a first non-recording area with a width $G1$ and a second non-recording area with a width $G2$ larger than $G1$, and wherein $G2$ is larger than MRW.

3. A magnetic recording medium comprising:
magnetically recordable recording tracks with a width $L1$;
non-recording areas between adjacent recording tracks; and
a wide land track having a width $L2$ larger than $L1$, wherein non-recording areas adjacent to sides of the recording track comprise a first non-recording area comprising a width $G1$ and a second non-recording area with a width $G2$ larger than $G1$ and wherein the second non-recording area is located within a range of 1 mm in a radial direction from the wide land track.

4. The magnetic recording medium of claim 3, wherein the second non-recording area is adjacent to the wide land track.

5. The medium of claim 3, wherein $L1$, $L2$, and $G1$ satisfy:
$$L2 \geq L1 + 2G1.$$

6. A method of testing a magnetic recording apparatus, the magnetic recording apparatus comprising:
a head slider comprising read and write heads; and
a magnetic recording medium, comprising:
    magnetically recordable recording tracks with a width $L1$;
    non-recording areas between adjacent recording tracks; and
    a wide land track comprising a width $L2$ larger than $L1$,
wherein non-recording areas adjacent to sides of a recording track comprise a first non-recording area with a width $G1$ and a second non-recording area with a width $G2$ larger than $G1$, and wherein the second non-recording area is located within a range of 1 mm in a radial direction from the wide land track,
the method comprising:
executing a test of a magnetic characteristic of a non-recording area using the second non-recording area.